United States Patent
Hsu et al.

(10) Patent No.: US 9,984,034 B2
(45) Date of Patent: *May 29, 2018

(54) DETACHABLE COMPUTER WITH VARIABLE PERFORMANCE COMPUTING ENVIRONMENT

(71) Applicant: Microsoft Technology Licensing, LLC, Redmond, WA (US)

(72) Inventors: Feng-Hsiung Hsu, Cupertino, CA (US); Xiong-Fei (Bruce) Cai, Beijing (CN); Chunhui Zhang, Beijing (CN); Rui Gao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/246,305

(22) Filed: Aug. 24, 2016

(65) Prior Publication Data

US 2017/0052922 A1    Feb. 23, 2017

Related U.S. Application Data

(63) Continuation of application No. 14/563,892, filed on Dec. 8, 2014, now Pat. No. 9,501,103, which is a (Continued)

(51) Int. Cl.
*G06F 1/32* (2006.01)
*G06F 1/16* (2006.01)
(Continued)

(52) U.S. Cl.
CPC ........ *G06F 13/4081* (2013.01); *G06F 1/1632* (2013.01); *G06F 1/1654* (2013.01); *G06F 1/3203* (2013.01); *G06F 1/3218* (2013.01)

(58) Field of Classification Search
CPC .... G06F 1/1632; G06F 1/1654; G06F 1/3203; G06F 1/3206; G06F 1/3218; G06F 13/4081
See application file for complete search history.

(56) References Cited

U.S. PATENT DOCUMENTS 5,008,658 A    4/1991    Russay et al.
5,200,913 A    4/1993    Hawkins et al.
(Continued)

FOREIGN PATENT DOCUMENTS

GB    2432688 A1    5/2007
WO    WO0107999 A1    2/2001
(Continued)

OTHER PUBLICATIONS

Chen et al., "Navigation Techniques for Duel-Display E-Book Readers", Retrieved at << http://citeseerx.ist.psu.edu/viewdoc/download?doi=10.1.1.148.1056&rep=rep1&type=pdf >>, Conferenee on Human Factors in Computing Systems; Proceeding of the twenty-sixth annual SIGCHI conference on Human factors in computing systems, Apr. 5-10, 2008, pp. 1779-1788.
(Continued)

*Primary Examiner* — Glenn A Auve
(74) *Attorney, Agent, or Firm* — Schwegman Lundberg & Woessner, P.A.

(57) ABSTRACT

Computing devices are often designed in view of a particular usage scenario, but may be unsuitable for usage in other computing scenarios. For example, a notebook computer with a large display, an integrated keyboard, and a high-performance processor suitable for many computing tasks may be heavy, large, and power-inefficient; and a tablet lacking a keyboard and incorporating a low-powered processor may improve portability but may present inadequate performance for many tasks. Presented herein is a configuration of a computing device featuring a display unit with a (Continued)

resource-conserving processor that may be used independently (e.g., as a tablet), but that may be connected to a base unit featuring a resource-intensive processor. The operating system of the device may accordingly transition between a resource-intensive computing environment and a resource-conserving computing environment based on the connection with the base unit, thereby satisfying the dual roles of workstation and portable tablet device.

18 Claims, 8 Drawing Sheets

Related U.S. Application Data continuation of application No. 12/822,594, filed on Jun. 24, 2010, now Pat. No. 8,909,838.

(51) Int. Cl.
*H05K 7/00* (2006.01)
*G06F 13/40* (2006.01)

(56) References Cited

U.S. PATENT DOCUMENTS

| | | | |
|---|---|---|---|
| 5,319,582 A | 6/1994 | Ma | |
| 5,625,829 A | 4/1997 | Gephardt et al. | |
| 5,877,829 A | 3/1999 | Okamoto et al. | |
| 6,145,029 A | 11/2000 | Deschepper et al. | |
| 6,398,370 B1 | 6/2002 | Chiu et al. | |
| 6,529,182 B1 | 3/2003 | Burton | |
| 7,009,665 B2 | 3/2006 | Li et al. | |
| 7,206,196 B2 | 4/2007 | Ghosh et al. | |
| 7,222,206 B2 | 5/2007 | Kee et al. | |
| 7,301,522 B2 | 11/2007 | Ko | |
| 7,301,601 B2 | 11/2007 | Lin et al. | |
| 7,348,958 B2 | 3/2008 | Park | |
| 7,502,221 B2 | 3/2009 | Fuller et al. | |
| 8,909,838 B2 * | 12/2014 | Hsu | G06F 1/1632 710/303 |
| 9,501,103 B2 * | 11/2016 | Hsu | G06F 1/1632 |
| 2002/0140690 A1 | 10/2002 | Gamsaragan et al. | |
| 2003/0112585 A1 | 6/2003 | Silvester | |
| 2003/0135771 A1 | 7/2003 | Cupps et al. | |
| 2003/0198008 A1 | 10/2003 | Leapman et al. | |
| 2005/0066209 A1 | 3/2005 | Kee et al. | |
| 2005/0111182 A1 * | 5/2005 | Lin | G06F 1/1632 361/679.41 |
| 2005/0185364 A1 | 8/2005 | Bell et al. | |
| 2005/0231978 A1 | 10/2005 | Kvenvold et al. | |
| 2006/0034039 A1 | 2/2006 | Van Rens | |
| 2006/0092182 A1 | 5/2006 | Diefenbaugh et al. | |
| 2006/0236144 A1 | 10/2006 | Chao | |
| 2007/0094435 A1 * | 4/2007 | Fry | G06F 1/1632 710/303 |
| 2007/0250653 A1 | 10/2007 | Jones | |
| 2007/0274093 A1 | 11/2007 | Haim et al. | |
| 2008/0246606 A1 | 10/2008 | Smith et al. | |
| 2008/0304688 A1 | 12/2008 | Kumar | |
| 2009/0016001 A1 | 1/2009 | Miyakawa et al. | |
| 2009/0219271 A1 | 9/2009 | Bandel et al. | |
| 2009/0256795 A1 | 10/2009 | Naum et al. | |
| 2009/0310292 A1 | 12/2009 | Tian et al. | |
| 2010/0013675 A1 * | 1/2010 | Bennett | G06F 3/038 341/5 |
| 2010/0014027 A1 | 1/2010 | Li et al. | |
| 2010/0033916 A1 | 2/2010 | Douglas et al. | |
| 2010/0138574 A1 | 6/2010 | Watanabe | |
| 2010/0238620 A1 | 9/2010 | Fish | |
| 2010/0306501 A1 | 12/2010 | Chang et al. | |
| 2010/0306564 A1 | 12/2010 | Kojo | |
| 2010/0321877 A1 | 12/2010 | Moser | |
| 2015/0095685 A1 | 4/2015 | Hsu et al. | |

FOREIGN PATENT DOCUMENTS

| | | |
|---|---|---|
| WO | WO2011163276 | 12/2011 |
| WO | WO2011163276 A2 | 4/2012 |

OTHER PUBLICATIONS

Koskela, Tomi "LED Backlighting for LCDs Requires Unique Drivers" Published Date: May 12, 2008, retrieved at <<http://powerelectronics.com/power_management/led_drivers/led-backlighting-lcd-power-efficiency-0512/>> pp. 1-3.
Final Office action for U.S. Appl. No. 14/563,892, dated Oct. 9, 2015, Hsu et al., "Detachable Computer With Variable Performance Computing Environment", 14 pages.
Office action for U.S. Appl. No. 14/563,892, dated Feb. 17, 2016, Hsu et al., "Detachable Computer With Variable Performance Computing Environment", 11 pages.
Office action for U.S. Appl. No. 14/563,892, dated May 24, 2016, Hsu et al., "Detachable Computer With Variable Performance Computing Environment", 9 pages.
Office action for U.S. Appl. No. 14/563,892, dated Jun. 18, 2015, Hsu et al., "Detachable Computer With Variable Performance Computing Environment", 12 pages.
International Preliminary Report cited in PCT Application No. PCT/US2011/041307 dated Decmeber 28, 2012, 6 pages.
Xie, Karin, "Samsung Begins Producing Ultra-Slim, Energy-Efficient LCD Panels with Edge-lit LED Backlighting" Published Date: Mar. 26, 2009, retrieved at http://www.samsung.com/us/business/semiconductor/newsView.do?news_id=992>> pp. 1-3.
"Final Office Action Issued in U.S. Appl. No. 12/822,594", dated Aug. 22, 2012, 12 Pages.
"Final Office Action Issued in U.S. Appl. No. 12/822,594", dated May 30, 2013, 12 Pages.
"Non Final Office Action Issued in U.S. Appl. No. 12/822,594", dated Dec. 24, 2013, 13 Pages.
"Non Final Office Action Issued in U.S. Appl. No. 12/822,594", dated Jan. 24, 2013, 12 Pages.
"Non Final Office Action Issued in U.S. Appl. No. 12/822,594", dated May 7, 2012, 11 Pages.
"Notice of Allowance Issued in U.S. Appl. No. 12/822,594", dated Apr. 14, 2014, 7 Pages.
"Notice of Allowance Issued in U.S. Appl. No. 12/822,594", dated Aug. 4, 2014, 5 Pages.
"Notice of Allowance Issued in U.S. Appl. No. 14/563,892", dated Jul. 15, 2016, 5 Pages.

* cited by examiner

DETACHABLE COMPUTER WITH VARIABLE PERFORMANCE COMPUTING ENVIRONMENT

RELATED APPLICATION

This application is a continuation of and claims priority to U.S. patent application Ser. No. 14/563,892, filed on Dec. 8, 2014, which is a continuation of and claims priority to U.S. patent application Ser. No. 12/822,594, filed on Jun. 24, 2010, the disclosure both of which are incorporated by reference herein.

BACKGROUND

Many classes of devices have been devised within the field of computing, such as workstations, servers, high-performance laptops, low-performance "netbook" laptops, tablets, palmtop computers such as ultramobile personal computers (UMPCs), personal data assistants (PDAs), mobile computers such as smartphones, thin clients, and specialized appliances, such as digital picture frames and kiosk computers. Each class of device is oriented to a typical usage scenario, and often features a set of hardware and software components that are selected and well-adapted for this scenario. Similarly, a user may acquire one or more devices of similar or different classes to fill various niches of the user's computing uses, such as a high-performance workstation computer for an office environment, a mid-range performance but lightweight laptop for extended use at home, and a smartphone for frequent use in mobile scenarios. Together, these devices may comprise the user's computing environment. Moreover, the devices may exhibit varying degrees of interoperability, such as automated file synchronization or remote access through a terminal services configuration.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While each device owned by a user may satisfy a particular niche within the user's computing environment, it may be disadvantageous for a device to be designed only for one typical computing scenario. In particular, the hardware and software configuration of a device may exhibit a tradeoff between performance and portability. Components that present more powerful computing capabilities (such as larger displays, high-performance graphics rendering components, powerful processors, and expansive banks of rapidly accessible memory) may increase the weight or size of the device or may draw more power, thereby reducing portability and/or battery life. Conversely, components that promote portability (such as smaller displays, power-efficient graphics rendering components, mobile processors, and solid-state memory devices) may be more expensive and/or may present reduced computational power, thereby reducing the performance and capabilities of the device. Therefore, it may be difficult to design a device that is sufficiently versatile to provide adequate performance in many computing scenarios.

Presented herein is an architecture for a device that may satisfy a broad range of computing scenarios by featuring a convertible design. This architecture involves a computer comprising a base unit, featuring a powerful base processor and one or more input devices (e.g., a keyboard, mouse, and/or touchpad), and a detachable display unit, featuring a (lower-powered but more power-efficient) display processor, a display output component, and a display battery, which may be connected to the base unit. When the detachable display unit is connected to the base unit, the operating system utilizes the more powerful components of the base unit, and also presents a resource-intensive mode of the computing environment (e.g., a full complement of applications that may present robust functionality.) However, when the display unit is disconnected from the base unit, the display unit continues to operate and to present the computing environment to the user, but switches to the display processor to reduce the power consumption of the device. The operating system also switches to a resource-conserving mode, e.g., by adjusting the display from a fully transmissive display mode to a partially or wholly reflective display mode, and/or by switching applications from a resource-intensive mode (such as a full-fledged media object editor) to a resource-conserving mode (such as a reduced-functionality media viewer.) However, the device endeavors to provide a consistent computing environment within the constraints of the components of the display unit.

In one such embodiment, the base unit may each feature a base memory (such as a hard drive or system RAM) that is separate from the memory of the display unit (such as additional system RAM or a solid-state storage device), and the operating system may be configured to store media objects and simple viewing applications in the display memory of the display unit, while storing all other data objects in the base memory of the base unit. The device may therefore permit the user to detach the display unit and to view the stored media objects on the display unit in the manner of a tablet, and to reconnect the display unit to the base unit in order to use the device in the manner of a laptop or workstation. Such configurations may provide seamless access to the media objects of the computing environment across satisfy several computing scenarios to which the device may be easily converted.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
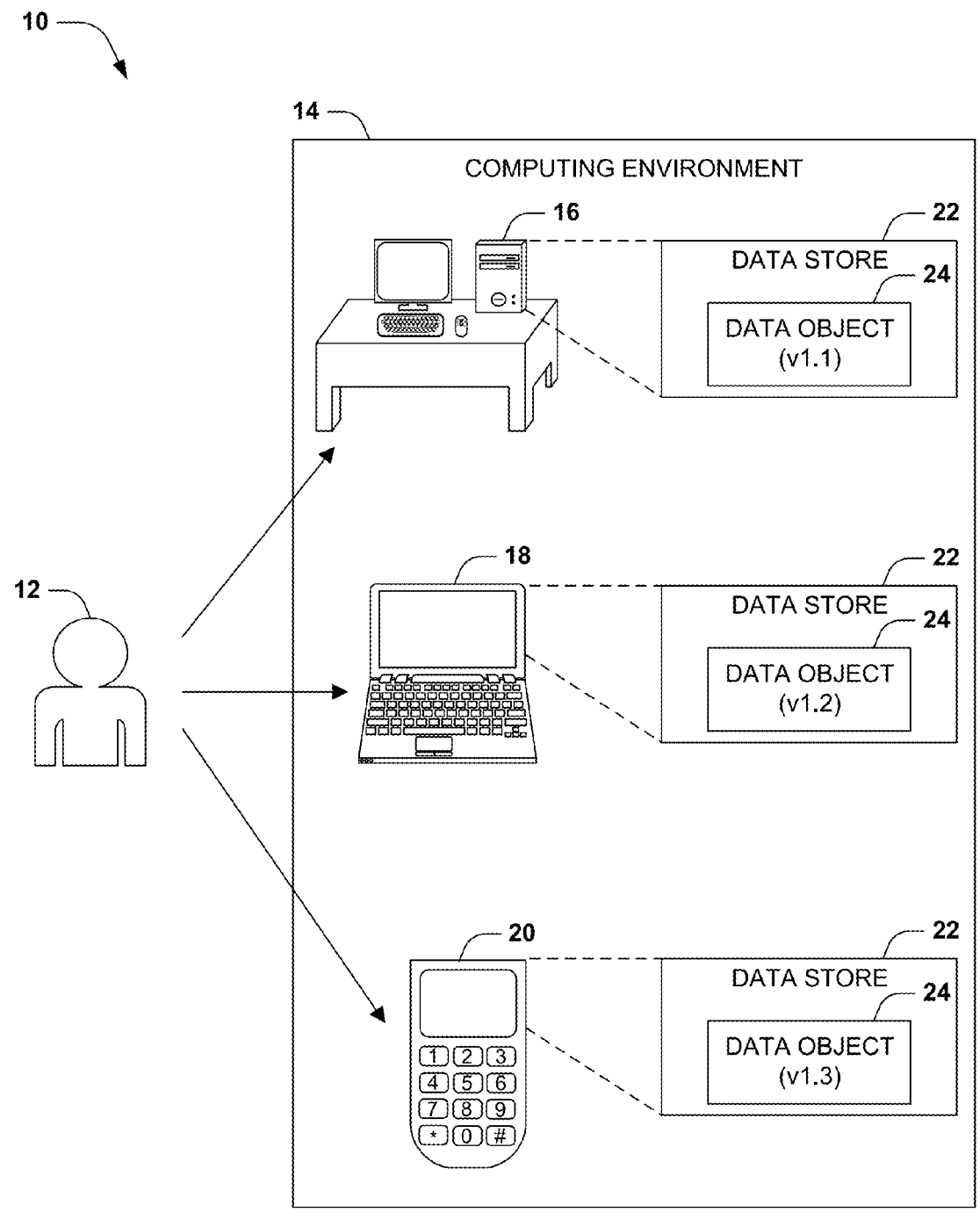
FIG. 1 is an illustration of an exemplary scenario featuring a computing environment of a user comprising a set of computing devices, each configured for a particular usage scenario of the user.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, devices may be designed and constructed in view of one or more computing scenarios wherein each device is likely to be used. As a first example, in an office environment, a user may wish to achieve high performance but may be unconcerned about mobility; therefore, a workstation or server computer may be designed with high-performance computing resources (e.g., fast general-purpose and graphical processors, arrays of storage devices, and a broad set of peripheral components), without regard to the power consumption or bulk of the components. As a second example, a user may seek a portable computer that may be moved to various locations, such as a high-performance laptop that achieves a balance between powerful components and a (marginally) portable, power-efficient design. As a third example, a "netbook" laptop may provide a full-fledged computing environment with a complete set of applications, but may be designed to produce a compact, lightweight, cheap device with power-efficient components that extend battery life (but at the expense of reduced computing power.) As a fourth example, a mobile device, such as a smartphone, may be specialized for handheld computing in a range of transient environments (e.g., standing or sitting, viewing indoors or outdoors, and intermittently connected to various communications networks) and a form factor that may fit within a user's pocket, but may present a limited computing environment with limited memory and processing power. As a fifth example, various "appliance" devices may be specialized for a specific usage scenario, such as a digital picture frame that autonomously retrieves images from an image source and displays them in a standalone mode, a portable media player that is configured to store and render media, a "kiosk" computer that is configured to present a limited interactive computing experience (such as a ticket purchasing device at a movie theater), and a "thin client" device that lacks traditional computing resources, but that remotely interfaces with one or more servers over a network to provide basic input and output capabilities.

Each of these devices therefore satisfies a particular usage scenario, and is specially designed with hardware and software components that are well-suited for that usage scenario. However, it may be difficult to design a device that is sufficiently versatile to perform well in a range of usage scenarios. As a first example, a user may prefer a laptop device with a large screen for extended use while traveling, but may prefer a laptop device with a small screen for more intermittent use in a transient or crowded location, such as on an airplane or at a café with wireless internet access. As a second example, a user may prefer a workstation to offer a robust computing environment with powerful computing power for running a broad set of sophisticated applications and games, but for computing in a transient context, the user may prefer a more basic user interface with a small set of simple applications that are quickly accessible.

Due to the limited set of usage scenarios for which each class of device is suitable, users often acquire and utilize a set of devices in the context of a broad computing scenario. FIG. 1 presents an exemplary scenario 10 wherein a user 12 interacts with a computing environment 14 distributed across several devices, including a high-performance but non-portable workstation 16 for office use; a laptop 18 for portable use while away from the office; and a smartphone 20 for rapid and convenient use in transit. Additional devices may be acquired to fulfill newly devised or newly realized computing scenarios (e.g., the user 12 may acquire a portable media player for playing music or videos in a more convenient context than the other devices, and a global positioning system (GPS) mapping device for navigating on foot or in a vehicle.) While some of these devices might fulfill more than one computing scenario (e.g., the smartphone 20 may be capable of storing and rendering media files), the user 12 may prefer to use a more specialized or suitable device for such scenarios, and/or may prefer to use both devices concurrently in different roles. Together, the devices of the computing environment 14 may satisfy the computing scenarios in which the user 12 engages.

However, the proliferation of devices comprising the computing environment 14 of the user 12 may present significant disadvantages. As a first example, the user 12 often has to acquire, configure, and maintain each device individually, thereby imposing additional administrative burdens with the addition of each new device. As a second example, it may be difficult to present a seamless computing environment 14 to the user 12 across all of the user's devices. For example, each device features a discrete set of capabilities, and presents a computing environment that is isolated from the computing environments of other devices. In the exemplary scenario 10 of FIG. 1, if each device comprises a data store 22 that stores a distinct set of data objects 24, difficulties may arise if multiple devices concurrently store a representation of the same data object 24. For example, if the data object 24 may be updated to new versions, different versions of the data object 24 may exist on each device, thereby causing consistency problems, data conflicts, and data loss. While some aspects of these devices may be harmonized (e.g., by automatically synchronizing data stores 22), the devices may not be configurable to present a consistent computing environment 14, such as the same set of available and executing applications, configured in the same manner, and operating on a consistently presented set of data objects 24. The gaps in seamlessness may cause frustration and inefficiency, e.g., if multiple versions of a data object 24 exist on various devices, or if an application existing on various devices is differently configured and exhibits a different behavior on each device.

Some efforts have been made to achieve greater versatility in the computing environments serviced by a particular device. As a first example, a portable device (such as a laptop) may be attachable to an "expansion base" or "dock," which may charge the battery of the laptop and may provide a single connection to a set of peripherals (e.g., a desktop LCD, keyboard, mouse, and external storage devices) that may otherwise have to be connected individually to the laptop. The higher-performance but less portable components connected to the laptop through the expansion base or dock may substitute or supplement the comparatively lower-performance components built into the laptop, thereby improving the use of the laptop in a stationary environment (such as an office environment.) As a second example, some "convertible" tablets and mobile computers feature both a display output component, which may be quickly accessible in transit, and a retractable keyboard, which may be easier to use in more stationary environments. As a third example, an operating system of a laptop may provide both a high-performance mode, wherein all components are utilized at full power (e.g., the display may be powered at full brightness), and a power-conserving mode, wherein components are operated at reduced power (e.g., the display may be dimmer) in order to conserve battery power and extend battery life. However, these features may confer only modest improvements in the range of computing scenarios for which the capabilities of such devices may be suitable.

Presented herein are techniques for designing a computing device that fits a broader range of computing scenarios than other convertible device techniques. These techniques involve the concepts of a "tablet" device (usually identified as a touchscreen display device lacking a hardware keyboard, but including a processor, storage, and a battery), which may be helpful for viewing media in a portable environment with less emphasis on key-based data entry, and a more traditional computing device, such as a high-performance notebook or a workstation, featuring a powerful and robust set of components (e.g., a high-speed and multi-core processor, a graphics processor, and plentiful storage capacity using a magnetic or solid-state storage device.) While these classes of devices are each particularly suitable in a limited set of computing scenarios, a device may be devised that serves both sets of computing scenarios, offering some or all advantages of a tablet and some or all advantages of a traditional computing device.

The present techniques therefore relate to the design of a computing device featuring a display unit comprising (among other components) a display output component, a (comparatively low-powered) display processor, a display battery, and a display memory, and a base unit comprising (among other components) a (comparatively high-powered) base processor, a base power source, and one or more input devices. Moreover, the display unit comprises a display connector (e.g., a downward-facing port positioned on a bottom surface or lower edge of the display unit), and the base unit comprises a base connector (e.g., an upward-facing port positioned on a top surface of the base unit), such that the display unit may be connected to the base unit (e.g., by positioning the display unit over the base unit, and lowering the display unit until the display connector and the base unit connect.) When the display unit is connected to the base unit, the device may utilize the high-powered base processor and all of the resources of the display unit and the base unit, and the operating system of the device may present a computing environment 14 to the user 12 in a resource-intensive mode (particularly if the base unit is connected to an external power source.) However, the user 12 may detach the display unit from the base unit (e.g., by lifting the display unit upward until the display connector and the base connector disconnect), and the display unit may continue to function and may seamlessly present the same computing environment 14 to the user 12, but in a resource-conserving mode (e.g., by reducing the brightness of the display output component, reducing the operating speed of the processor, and/or transitioning running applications into a low-performance mode that conserves computing resources.) By presenting the same computing environment 14 to the user 12 (but in a resource-intensive state or a resource-conserving state), regardless of whether the device may utilize the more powerful components and external power source of the base unit or whether the device is detached.

Figure 2:
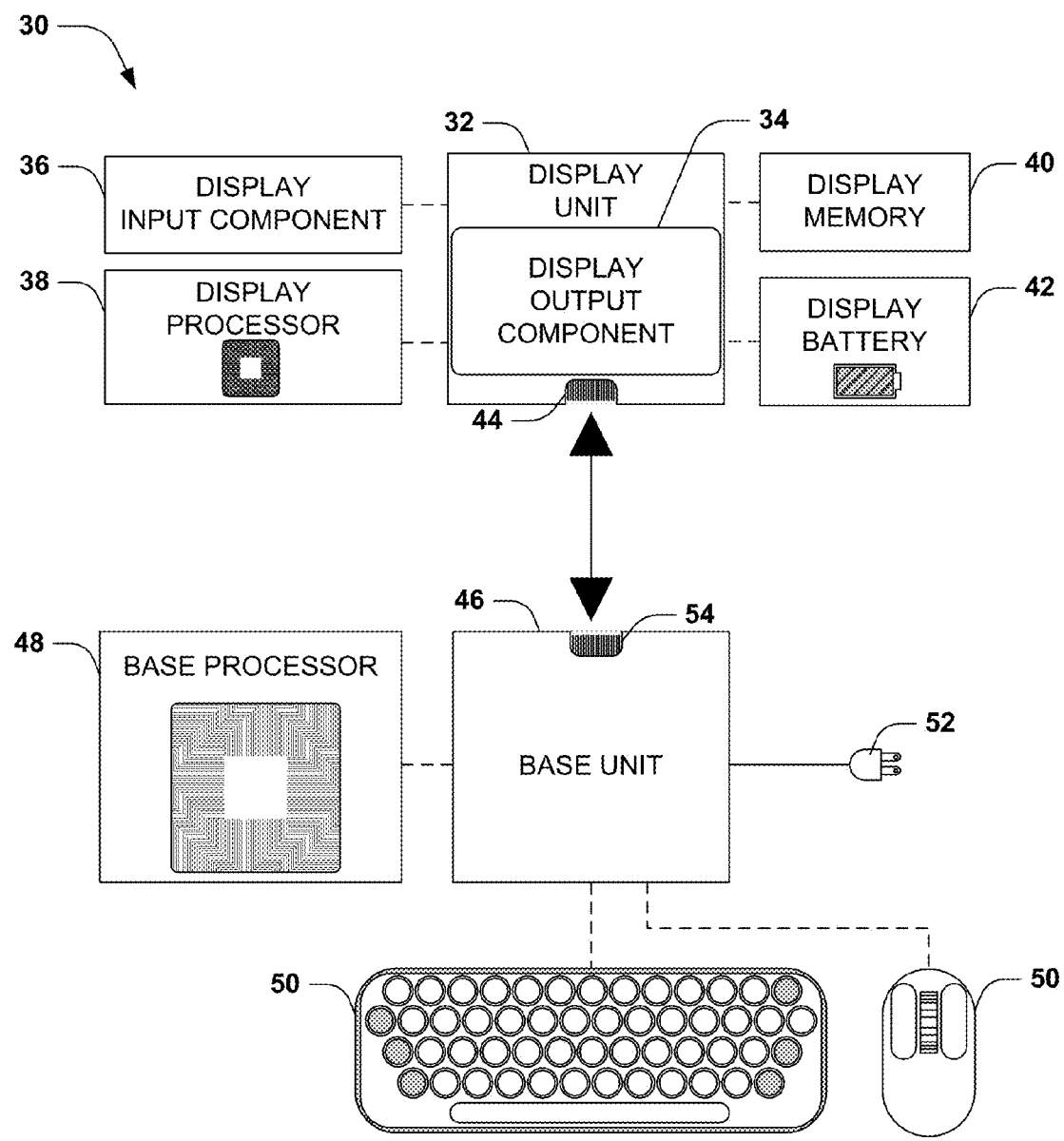
FIG. 2 is an illustration of a device configured according to the techniques presented herein to serve a broad set of usage scenarios of the user.

FIG. 2 presents an exemplary scenario 30 illustrating a device configured in this manner. This exemplary scenario 30 includes a display unit 32, which comprises a display output component 34 that renders visual output of the computing environment. The display unit 32 also features one or more display input components 36, which receive input from the user for application within the computing environment. In this exemplary scenario 30, the display output component 34 also operates as a display input component 36, e.g., as a touchscreen device capable of detecting contact with human skin or a tip of a specialized stylus. The display unit 32 also comprises a display processor 38 (e.g., a general-purpose processor, preferably of low power consumption, that is capable of generating a computing environment for presentation on the touchscreen device 34.) The display unit 32 also features a display memory 40 (e.g., system RAM, a hard disk drive, or a solid-state storage device) and a display battery 42 (e.g., a rechargeable lithium ion or nickel metal hydride battery capable of powering a tablet-class computing device.) The device also comprises a base unit 46, featuring a base processor 48 (e.g., a high-performance processor capable of providing fast and powerful computation), one or more base input components 50 (e.g., a hardware keyboard and a mouse), and a base power source 52 (e.g., a power adapter that can be plugged into a wall outlet.) The display unit 32 also features a display connector 44, and the base unit 46 also features a base connector 54, and these connectors may be coupled to confer access by the display unit 32 to the computing resources of the base unit 46. Alternatively, the display unit 32 may be detached from the base unit 46, and (pursuant to the touch-sensitive aspect of the display input component 34 of this exemplary device) may be used as a "tablet"-class computing device with reduced processing power but improved portability.

Figure 3:
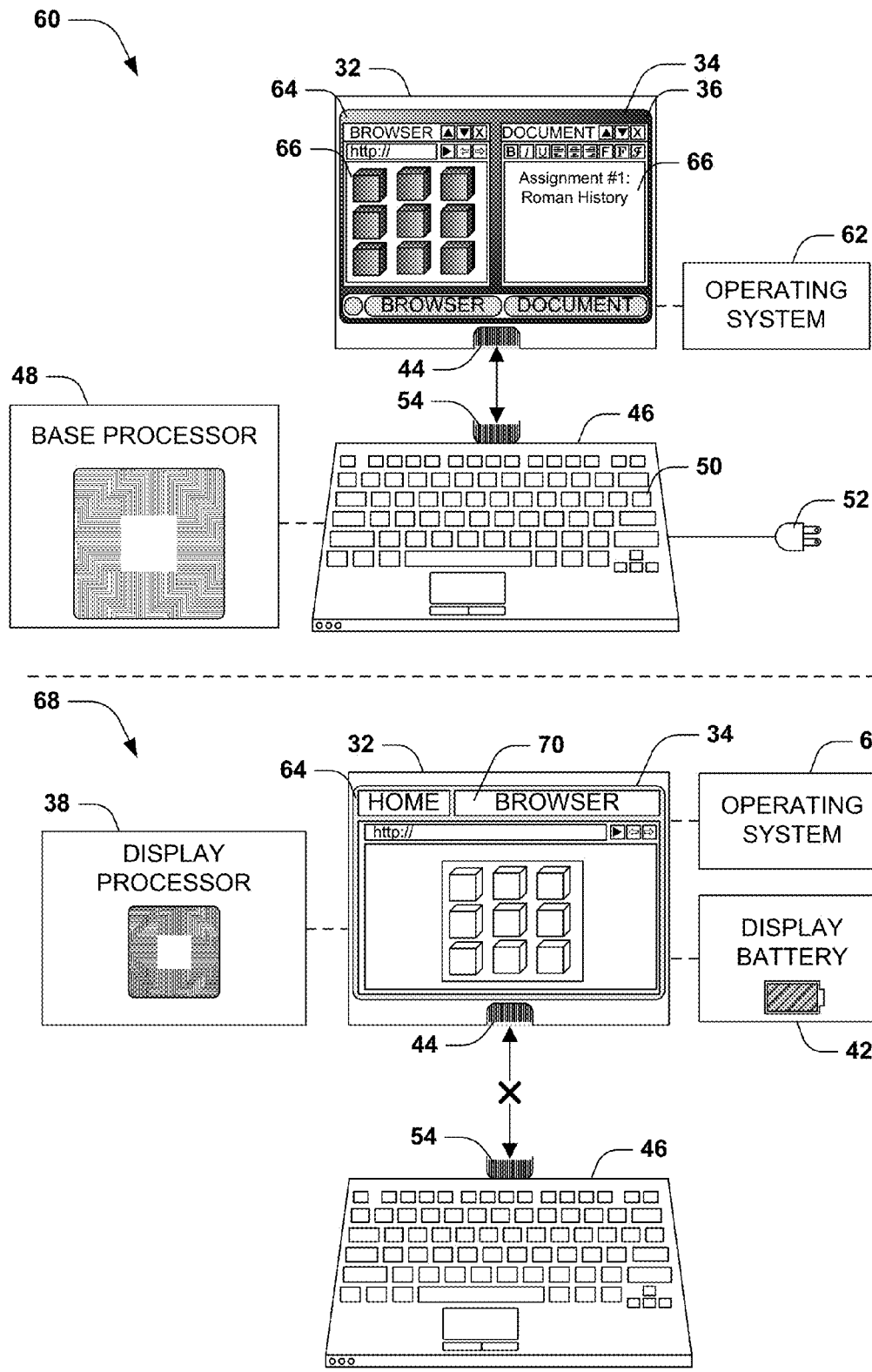
FIG. 3 is an illustration of two configurations of a device configured according to the techniques presented herein, each configuration serving a usage scenario of the user.

FIG. 3 presents an exemplary scenario featuring alternative modes of operation of another device designed according to the techniques discussed herein. This device also features a display unit 32 connectable to a base unit 46, but the base unit 46 is designed in the manner of a laptop device with an integrated hardware keyboard as a base input component 50. The display unit 32 again features a display output component 34, which also serves as a display input component 36 in the manner of a "touchscreen" device. In a first configuration 60 of this device, the display connector 44 of the display unit 32 is connected to the base connector 54 of the base unit 46. In this first configuration 60, the display unit 32 may utilize the display output component 34 to render a visual presentation of a computing environment, but may utilize the base process 48 of the base unit 46 to achieve the presentation of a full-featured computing environment, and may also utilize the base input component 50 (e.g., the hardware keyboard) and the base power source 52. By utilizing these resources, an operating system 62 executing on the display unit 32 may generate and present a computing environment 64 in a high-performance and resource-intensive mode. For example, the operating system 62 may generate a computing environment 64 featuring a windowed graphical environment with true multitasking, including the concurrent execution and presentation of multiple applications 66 and a taskbar to facilitate application management, and a wide range of graphical effects.

The exemplary scenario of FIG. 3 also illustrates a second configuration 68 of this device, wherein the display unit 32 is detached from the base unit 46, but continues to function and to provide a similar computing environment 64 to the user 12 (e.g., a similar set of available applications configured in a similar manner; a similar set of data objects such as a filesystem, a similar set of presently executing applications in the same state and operating on the same data both before and after disconnection from the base unit 46.) However, in this second configuration 68, the display unit 32 draws power from the display battery 42 and utilizes the (lower-powered but more energy-efficient) display processor 38, and may not be capable of rendering the high-performance mode of the computing environment 64 in the same manner as the more powerful base processor 48 without rapidly depleting the display battery 42. Accordingly, the operating system 62 may instead generate and present the computing environment 64 on the display output component 34 in a lower-performance but resource-conserving mode. As a first example, instead of offering true multitasking and a windowed graphical environment, the operating system 62 may present a single-application execution model, wherein a single application is executed and displayed at a time, which may be suspended or terminated before a first executing application may be instantiated or resumed. As a second example, the operating system 62 may present the computing environment 64 with fewer graphical effects (e.g., user interface animations in menus may be reduced or substituted with static icons.) As a third example, while the same set of applications 66 may be available and may be configured to exhibit consistent behavior in both modes, one or more applications 66 may adjust is operation to promote the resource-conserving mode of the operating system 64. For example, while the operating system 64 is operating in a high-performance, resource-intensive mode, a media rendering application may present a robust set of editing operations including many computationally intensive operations; but while the operating system 64 is operating in a low-performance, resource-conserving mode, the same application may present a reduced set of operations related to media viewing and simple media editing operations. In this manner, the operating system 62 may adapt the presentation of the computing environment 64 to utilize the available components in the present configuration of the device, and the device may exhibit broad adaptability to a wide range of computing scenarios than may be achieved through other configurations.

Figure 4:
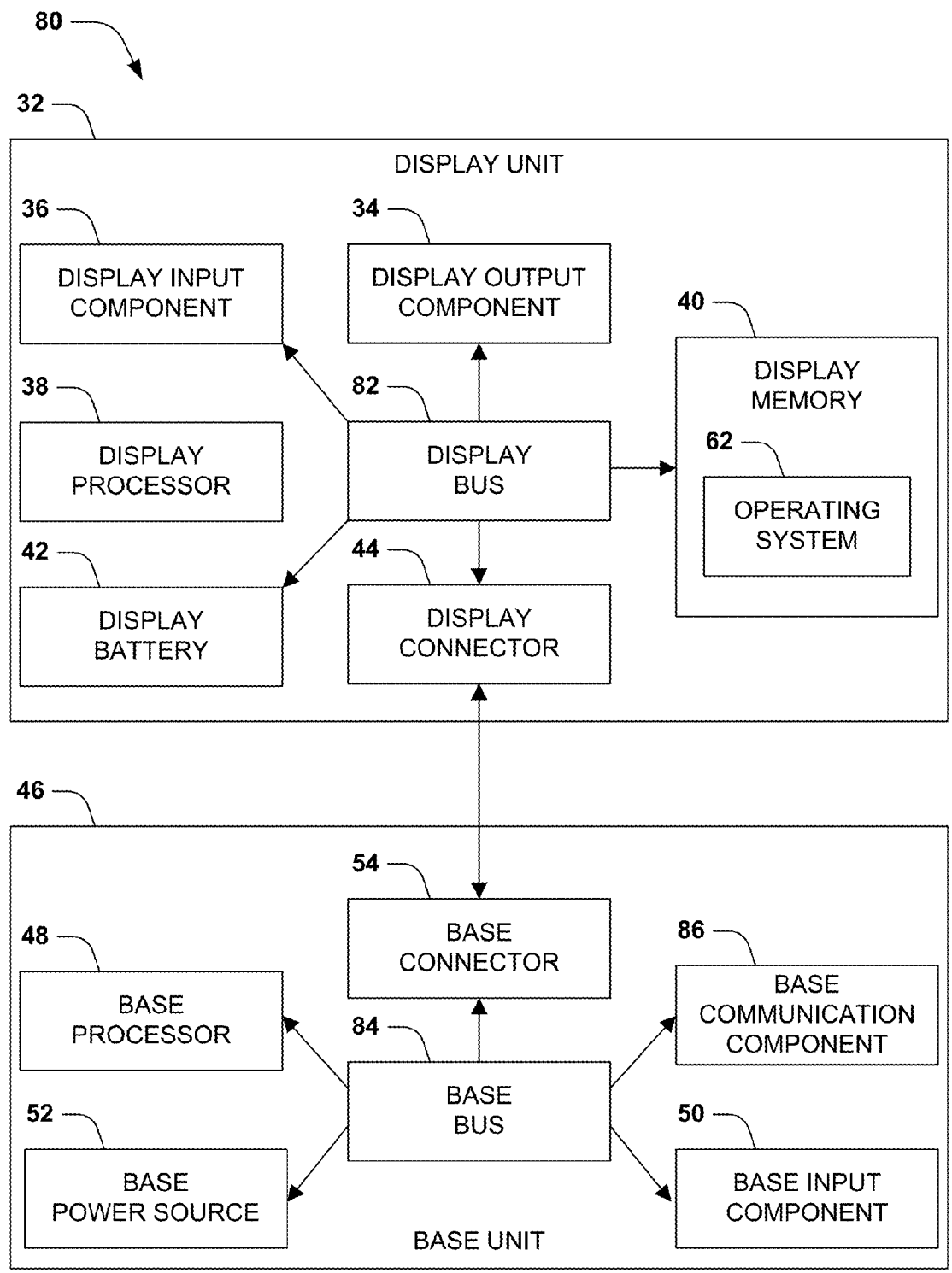
FIG. 4 is a component block diagram illustrating some exemplary embodiments of the techniques presented herein.

FIG. 4 presents an exemplary scenario 80 featuring several embodiments of the techniques presented herein. This exemplary scenario 80 includes, as a first embodiment of these techniques, a display unit 32 that is configured to interface with a base unit 46 having a base processor 48 and a base connector 54. The display unit 32 comprises a display bus 82 that connecting a set of other components of the display unit 32, including a display output component 34; a display processor 38; a display battery 42; a display memory 40 storing an operating system 62; and a display connector 44 that is configured to connect to the base connector 54 of the base unit 46. Moreover, the operating system 62 of the display unit 32 is configured to, while the display unit 32 is connected to the base unit 46, utilize the base processor 48 to generate a resource-intensive mode of a computing environment 64; and while the display unit 62 is disconnected from the base unit 46, utilize the display processor 38 to generate a resource-conserving mode of the computing environment 64. The exemplary scenario 80 also includes, as a second embodiment of these techniques, a base unit 46 that is configured to interface with a display unit 32 comprising a display output component 34 and a display connector 44. The base unit 46 comprises a base bus 84 that connects a set of other components of the base unit 46, including a base input component 50; a base power source 52; a base connector 54 configured to connect to the display connector 44 of the display unit 32; and a base processor 48 that is configured to, while the display unit 32 is connected to the base unit 46, generate a resource-intensive mode of a computing environment 64. The base unit 46 may also have other peripherals, e.g., a base communication component 86, such as a network adapter. The exemplary scenario 80 also features a third embodiment of these techniques, comprising the combination of the display unit 32 and the base unit 46, where the display memory 40 stores an operating system 62 that is configured to, while the display unit 32 is connected to the base unit 46, utilize the base processor 48 to generate a resource-intensive mode of a computing environment 64; and while the display unit 32 is disconnected from the base unit 46, utilize the display processor 38 to generate a resource-conserving mode of the computing environment 64. These embodiments therefore provide hardware and software components suitable to satisfy a range of computing scenarios, including those traditionally covered by a tablet computer and a workstation and/or laptop computer.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary embodiments illustrated in FIG. 4) to confer individual and/or synergistic advantages upon such embodiments.

Figure 5:
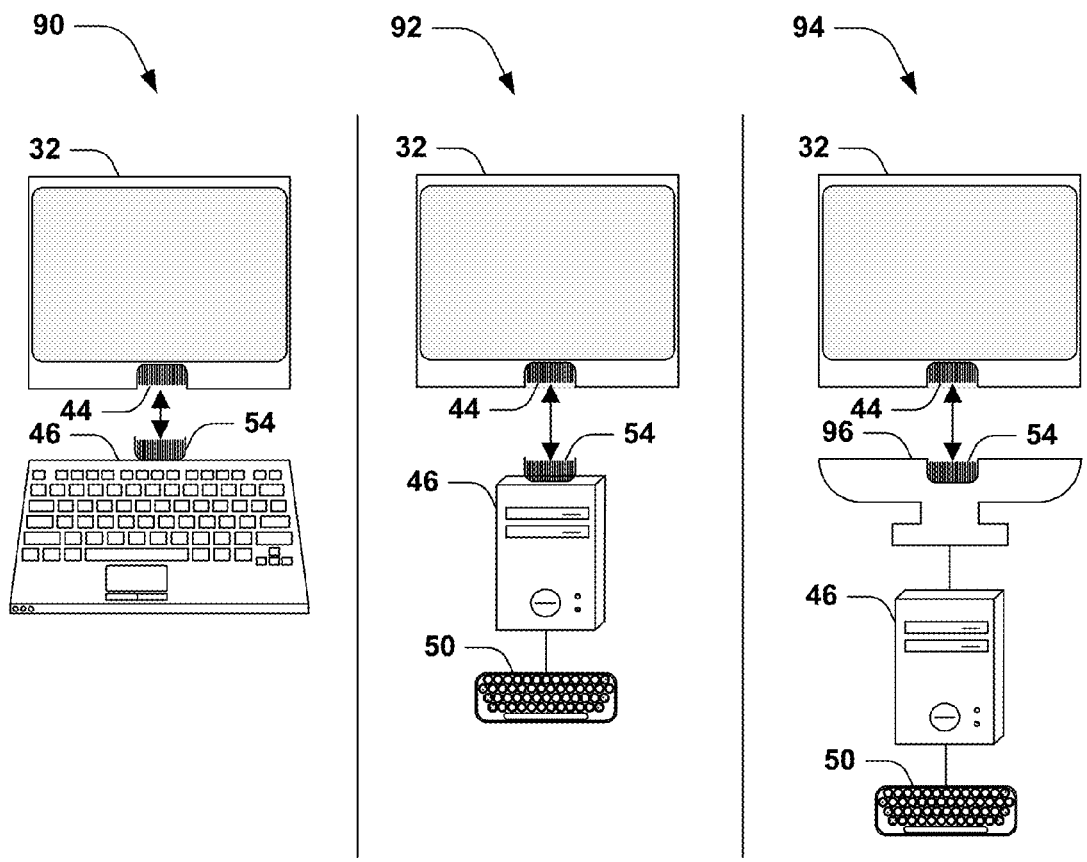
FIG. 5 is an illustration of an exemplary scenario featuring various configurations of a base connector of a base unit configured to couple with a display connector of a display unit.

A first aspect that may vary among embodiments of these techniques relates to the general scenario and configurations of the display unit 32 and the base unit 46 as a computer. FIG. 5 illustrates a few exemplary configurations, including a first configuration 90 where the display unit 32 fits into the base unit 46 to form a conventional notebook computer (but where the display unit 32 is detachable and may operate independently according to the techniques presented herein.) In a second configuration 92, the base unit 46 resembles a conventional desktop computer with a base input component 50 comprising a hardware keyboard, and the display unit 32 fits into the base unit 46. In a third configuration 94, the base unit 46 is attached to a pedestal 96 that resembles the base of an LCD monitor, and the display unit 32 fits into the pedestal 94 to resemble a standard LCD monitor that may be used in a desktop computing scenario. Additional configurations may also be devised. In a fourth example of this first aspect, the base unit 46 may be attached to an expansion base or dock that is configured to receive the display unit 32, and the expansion base or dock may be positioned near the workspace of the user 12 or some distance away from the workspace. (In contrast with a conventional arrangement of a notebook computer fitting into a dock or expansion base, the expansion base or dock interfaces the display unit 32 with the base unit 46 in order to allow the display unit 32 to utilize the base processor 48 of the base unit 46.) In a fifth example of this first aspect, a user 12 may own more than one base unit 46 and/or more than one display unit 32, and the base units 46 and display units 32 may be interchangeable. For example, a user 12 may position a first base unit 46 in a home environment and second base unit 46 in an office environment, and may carry the display unit 32 therebetween as a data store of documents that may be utilized in either location. The base units 46 may also be of an identical configuration or a different configuration. As another example, a set of employees may each own a display unit 32, and may utilize various workspaces in an office environment where each workspace is equipped with a base unit 46, thereby providing a portable and personalized computing environment for each employee while permitting higher-performance computing within the office. In a sixth example of this first aspect, the base units 46 may comprise stand-alone servers, such that when the display unit 32 is detached, the base unit 46 may continue to operate in an automated and unattended manner. In a seventh example of this first aspect, the base units 46 may have separate storage and a separate display device, and when the display unit 32 is detached, the base unit 46 may be operable as a workstation. Those of ordinary skill in the art may devise many configurations and scenarios wherein the techniques presented herein may be utilized.

A second aspect that may vary among embodiments of these techniques relates to the configuration of the display connector 44 and the base connector 54. As a first example, while the connectors are generally configured to couple the components of the display unit 32 with those of the base unit 46, many techniques may be utilized to implement this coupling. As a first example, the display connector 44 and the base connector 54 may together form a high-performance bridge between the display bus 82 of the display unit 32 and the base bus 84 of the base unit 46, thereby forming a traditional computing architecture where the components may communicate with high throughput. As a second example, the display connector 44 and the base connector 54 may form other types of couplings, such as a network connection that utilizes a network protocol to establish communication between the display unit 32 and the base processor 48, and/or a communication link based on other established protocols, such as a Universal Serial Bus (USB) connection or an IEEE 1394 ("Firewire") connection. Some of these communications protocols may also allow the display connector 44 and/or the base connector 54 to signal connection and disconnection events to the display unit 32 and/or the base unit 46. Alternatively, the operating system 62 executing on the display unit 32 may simply detect the availability of the components of the base unit 46 (e.g., in a "Plug and Play" architecture), and may preferentially utilize the components of the base unit 46 when available. As a third example, the display connector 44 and the base connector 54 may couple through many types of physical configurations, and may communicate through many types of physical properties, including an optical connection and an electrical connection.

As a fourth example of this second aspect, the configuration of the connection between the display unit 32 and the base unit 46 may present other features in addition to the interoperation of the components thereof. In a first such variation, the base unit 46 may serve as a stand for the display unit 32, and may permit the display unit 32 to be positioned in a convenient location. In a second such variation, the base unit 46 may serve as a physical guard for the display unit 32. For example, the display input component 36 of the display unit 32 may be easily damaged by physical contact (e.g., scratching of the display surface or pressure-induced damage to an LCD matrix that results in stuck pixels, dead spots, or brightness inconsistencies.) The display unit 32 may therefore be configured to be inserted into the base unit 46, which may feature a harder and more damage-resistant exterior. This configuration may be designed for stationary use (e.g., the base unit 46 may comprise a heavy shield providing high resistance to damage) and/or for portable use (e.g., the base unit 46 may comprise a comparatively light shell that provides a modest improvement in the durability of the computer, while not unmanageably increasing the weight of the combined computer to a non-portable magnitude.) Alternatively or additionally, the base unit 46 may include a locking mechanism that locks the display unit 32 into the base unit 46, and that restricts removal of the display unit 32 unless the base unit 46 is unlocked (e.g., with a physical key, a combination, a software security credential such as a password, and/or identity validation via a biometric input component such as a fingerprint reader.) Those of ordinary skill in the art may devise many configurations of the display connector 44 and the base connector 54 while implementing the techniques presented herein.

A third aspect that may vary among embodiments of these techniques relates to the configuration of the display output component 34 of the display unit 32. As a first example, the display output component 34 may be implemented separately from the at least one display input component 36, or may be implemented together with the display input component 36, e.g., as a touch-sensitive display. This type of hybrid input/output component may be implemented using many types of touch-sensitive technologies (e.g., a pressure-sensitive surface, a capacitative surface capable of detecting contact with a human hand, or a magnetically sensitive surface capable of detecting the proximity of a touch device, such as a stylus.) A touch-sensitive implementation of the display output component 34 may also accept many forms of input from a user 12, including pointing input (such as may simulate the manipulation of a pointer using a mouse or trackball), a software keyboard presented on the display output component 34 to detect user input representing keystrokes, natural handwriting, or a symbolic text entry system (e.g., a shorthand character entry system.)

As a second example of this third aspect, the display output component 34 may utilize many forms of display technology, such as a liquid crystal display (LCD) or light-emitting diode (LED) display or a projection display. A particular configuration of an LCD-based display output component 34 that may be suitable in view of the broad range of usage scenarios wherein the display unit 32 may be operated involves the implementation of a dual-mode display, such that while the display unit 32 is connected to the base unit 46, the display output component 34 displays the computing environment 64 in a transmissive display mode, but while the display unit 32 is disconnected from the base unit 46, the display output component 34 displays the computing environment 64 in an at least partially reflective display mode. Alternatively or additionally, the display output component 34 may feature an adjustable viewing angle. For example, when operated in a resource-intensive mode (or in a public viewing mode), the display output component 34 generates output that is viewable from many angles (e.g., as a user walks past the display output component 34, the quality of display may remain substantially consistent.) However, when operated in a resource-conserving mode (or in a private viewing mode), the display output component 34 restricts the output to a narrower viewing angle that is of high appearance to a user positioned directly in front of the display, but that rapidly degrades in quality (e.g., brightness, contrast, and clarity) when viewed at an increasingly steep angle from the center of the display output component 34. These configurations may be advantageous for implementing the display output component 34 in a manner that provides a high-quality display when the device is operating in a resource-intensive mode, but that provides a lower-quality but more resource-conserving display when the device is operating in a resource-conserving mode. Additionally, this configuration may be advantageous for permitting an at least partially reflective display mode when the display unit 32, while detached, may be utilized outdoors, where the reflective display mode may present an improved display over a fully transmissive display mode.

Figure 6:
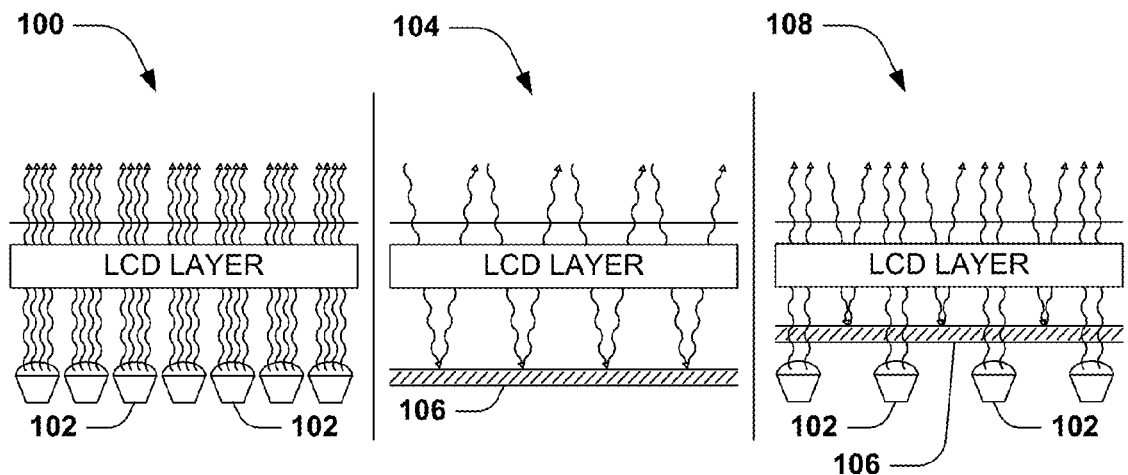
FIG. 6 is an illustration of an exemplary scenario featuring various transmissive and/or reflective properties of the display output component of a display unit.

FIG. 6 presents an example of some configurations of an LCD-based display output component 34 that may present various display modes. As a first example 100, a display output component 34 may be configured in a fully transmissive display mode, where a series of lamps 102 serve as a backlight to an LCD layer in order to transmit colored light. This configuration may be useful in dim environments, but the lamps 102 often consume significant power that may rapidly drain the display battery 42, and may also be difficult to see in bright environments, such as in direct sunshine in an outdoor setting. As a second example 104, a reflective surface 106 may be positioned behind the LCD layer to provide a fully reflective display mode, wherein ambient light may be reflected back through the LCD layer to transmit the colors of the display output component 34. This configuration may be useful in bright environments, and may improve battery life, but may be difficult to view in dim environments. A third example 108 involves a mixed configuration, featuring both a series of lamps 102 that may serve as a backlight in order to provide a transmissive display mode, and a reflective surface 106 that may reflect ambient light (implemented, e.g., as a one-way reflective surface that may not interfere with the light transmitted by the series of lamps 102.) Additionally, this configuration may vary the display mode of the display output component 34 by utilizing the lamps 102 when the display unit 32 is connected to the base unit 46 in order to provide a transmissive display mode, and by turning off the lamps 102 and relying on the reflective surface 106 when the display unit 32 is disconnected from the base unit 46 to provide a fully reflective display mode. Alternatively or additionally, the display output component 34 may utilize a partially transmissive and partially reflective display mode by powering the lamps 102 at a lower power when the display unit 32 is disconnected from the base unit 46, thereby conferring both transmissive and reflective properties that may provide suitable display capabilities in a wide range of environments. Moreover, the power of the lamps 102 may be varied, e.g., proportionally with a detected amount of ambient lighting.

As a third example of this third aspect, the display output component 34 of the display unit 32 may be utilized in various ways in relation to the base unit 34. In a first such variation, the base unit 46 may include a base display (e.g., a desktop LCD display attached to the base unit 46.) The operating system 62 may be configured to, while the display unit 32 is connected to the base unit 46, present the computing environment 64 on the base display (and may optionally power down the display output component 32 in this configuration), but while the display unit 32 is disconnected from the base unit 46, present the computing environment 64 on the display output component 32. As a first alternative, while the display unit 32 is connected to the base unit 46, the operating system 62 may present the same view of the computing environment 64 on both the display output component 32 and the base display. As a second alternative, while the display unit 32 is connected to the base unit 46, the operating system 62 may present the computing environment 64 across the base display and the display output component 34, e.g., by stretching the virtual desktop space across both display components. In a second such variation, the base unit 46 may lack a separate display component, and the display output component 34 may be utilized to display the computing environment 64 both when the display unit 32 is attached to the base unit 46 and when the display unit 32 is detached from the base unit 46.

Figure 7:
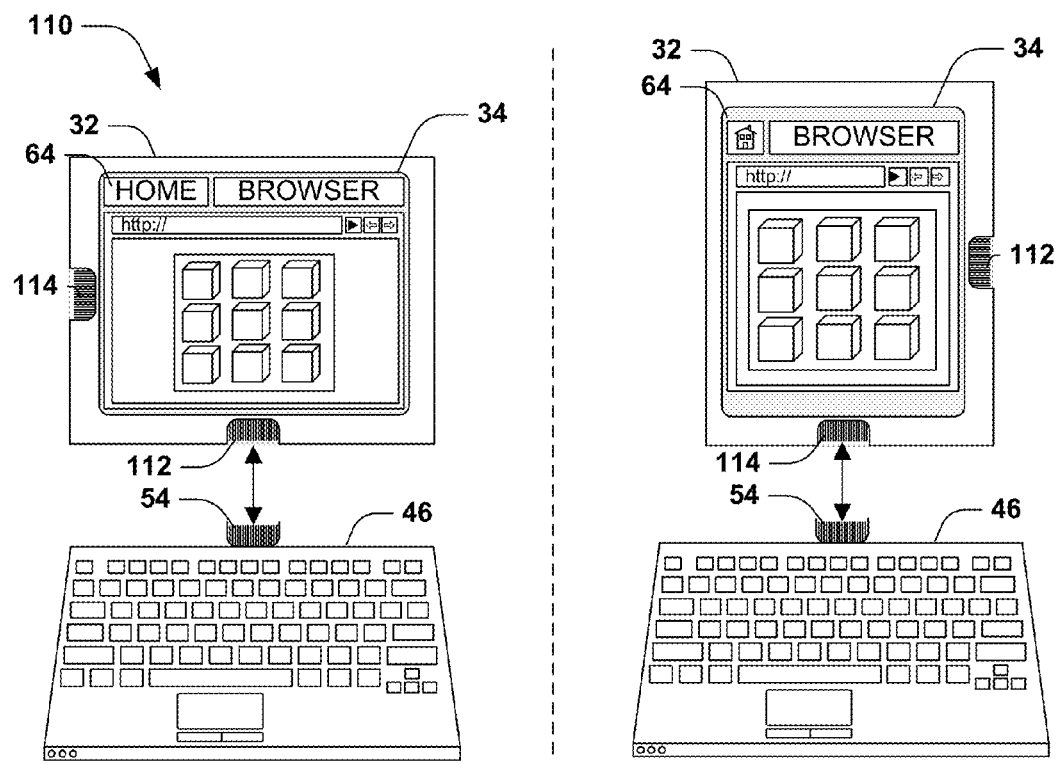
FIG. 7 is an illustration of an exemplary scenario featuring various orientations of a display unit connecting with a base unit.

In a third such variation, the display unit 32 may be positioned in various orientations, and may support several such orientations based on the preferences of the user 12. FIG. 7 presents an exemplary scenario 110 wherein the display unit 32 features two display connectors 44: a landscape display connector 112 positioned at a longitudinal edge of the display unit 32, and a portrait display connector 114 positioned at a lateral edge of the display unit 32. When the display unit 32 is connected to the base unit 46 using the landscape display connector 112, the operating system 62 presents the computing environment 64 in a landscape display mode (e.g., where the width of the desktop space is greater than the height of the desktop space); but when the display unit 32 is connected to the base unit 46 using the portrait display connector 114, the operating system 62 presents the computing environment 64 in a portrait display mode (e.g., where the height of the desktop space is greater than the width of the desktop space.) This configuration may permit the user 12 to orient the view of the computing environment 46 according to the preference of the user 12. Those of ordinary skill in the art may devise many configurations of the display output component 34 while implementing the techniques presented herein.

A fourth aspect that may vary among embodiments of these techniques relates to the configuration of the display input component 36 of the display unit 32. In some embodiments, the display input component 36 may comprise a distinct component, such as a hardware keyboard integrated with the display unit 32; a pointing device such as a joystick, pointing stick, trackball, or touchpad; a microphone configured to accept voice input from the user 12; and a camera configured to detect gestures of the user 12. In other embodiments, the display input component 36 may be integrated, e.g., with the display output component 34, such as in the configuration of a touchpad device, and may receive touch input in many ways (e.g., a capacitative surface that is capable of detecting fingertip touches, a magnetically sensitive surface that is capable of detecting touches from the magnetic tip of a specialized stylus, or a pressure-sensitive surface that is capable of detecting pressure from any object.) The display unit 32 might also include a set of display input components 36, and may alternatively enable or disable the display input components 36 when the display unit 32 is connected to the base unit 46. Those of ordinary skill in the art may devise many configurations of the display input components 36 of the display unit 32 while implementing the techniques presented herein.

A fifth aspect that may vary among embodiments of these techniques relates to the configuration and usage of the base power source 52 of the base unit 46. As a first example, the base unit 46 may include a power supply that may be connected to a wall outlet, which may be suitable if the base unit 46 is situated in a non-portable desktop configuration (such as the second configuration 92 and the third configuration 94 presented in FIG. 5.) However, in other configurations, the base unit 46 may also be portable (e.g., in the first configuration 90 presented in FIG. 5), and may also include a base battery that supplements the power provided by the display battery 42. For example, the base unit 46 may incorporate a larger and higher-capacity that may be heavier and less portable than the display battery 42 of the display unit 32, but that may provide longer battery life while utilizing the more powerful but less power-efficient base processor 48. Additionally, the display unit 32 may preferentially utilize the base batter before utilizing the display battery 42. For example, while the display unit 32 is connected to the base unit 46, and while the base unit 42 is connected to an external power source (e.g., a power supply drawing power from a wall outlet), the display unit 32 may utilize the external power source (and may also recharge the base battery 46 and/or the display battery 42); but while the base unit 46 is disconnected from an external power source, the display unit 32 and/or the operating system 62 may utilize the base battery while the base battery is not depleted, and may utilize the display battery 42 while the base battery is depleted. In this manner, the computer may conserve the portability of the display unit 32, even if the base battery is fully depleted. Additionally, the operating system 62 may be configured to, while the display unit 32 is connected to the base unit 62 that is disconnected from an external power source and has a depleted base battery, enter a resource-conserving mode of the computing environment 64 (e.g., by powering down some or all of the components of the base unit 46 and relying only on the components of the display unit 32), in recognition of the diminishing power availability of the computer. Those of ordinary skill in the art may devise many configurations of the power usage of the display unit 32 and the base unit 46 (with or without a base battery) while implementing the techniques presented herein.

A sixth aspect that may vary among embodiments of these techniques relates to communication component(s) that may be built into the display unit 32 and/or the base unit 46. As a first example, the display unit 32 may include a display communication component, which may comprise a wired network adapter, a wireless network adapter configured to access a WiFi or cellular network, or a short-range communication component such as a Bluetooth or infrared adapter, and the base unit 46 may lack any such communication component. Conversely, and as a second example, the display unit 32 may lack a communication component, and may rely on a base communication component 86 included in the base unit 46 for communication when connected to the base unit 46. As a third example, the display unit 32 and the base unit 46 may each may have a display communication component, which may be of the same type as the base communication component 86 or a different type. The display communication component may operate independently of the base communication component 86, or may communicate with each other (e.g., a Bluetooth transmitter and receiver built into the display unit 32 and the base unit 46, or vice versa, to establish wireless communication therebetween.) For example, if the display unit 32 includes a display wireless communication component and the base unit 46 includes a base wireless communication component, the operating system 62 may be configured to, while the display unit 32 is disconnected from the base unit 46, automatically establish a wireless connection between the display wireless communication component and the base wireless communication component. Those of ordinary skill in the art may devise many implementations and uses of the communication components incorporated in a display unit 32 and/or base unit 46 while implementing the techniques presented herein.

A seventh aspect that may vary among embodiments of these techniques relates to the usage of the display memory 40 of the display unit 32. As a first example of this seventh aspect, many types of memory and storage technologies may be utilized to implement the display memory 40, including volatile or nonvolatile memory, a hard disk drive, and a solid-state or flash-based storage device. It may be advantageous to implement the display memory 40 using solid-state technologies instead of hard disk drive technologies that involve a rotating disc, due to the portability of the display unit 32.

Figure 8:
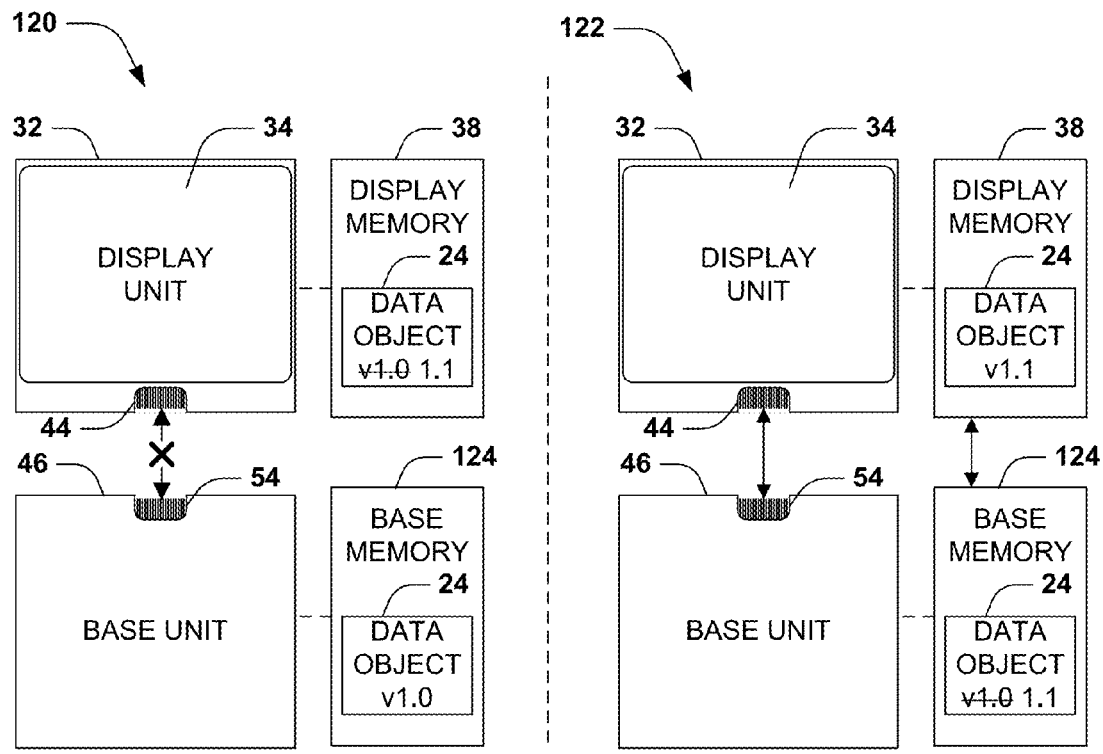
FIG. 8 is an illustration of an exemplary scenario featuring a synchronization of a data object concurrently stored in a base memory of a base unit and a display memory of a display unit.

As a second example of this seventh aspect, the base unit 46 may lack any memory or storage component, and the display unit 32 may rely wholly on the display memory 40 to store the data of the computer. Alternatively, the base unit 46 may incorporate a separate base memory that may supplement the display memory 40. This supplementation may be implemented in many variations. In a first such variation, data objects 24 may be primarily stored on the base unit 46, but particular data objects 24 may also be stored on the display unit 32 for remote access when disconnected from the base unit 46. Moreover, when the display unit 32 and the base unit 46 reconnect, the display unit 32 may synchronize the data objects 24 stored in the display memory 40 with the base memory of the base unit 46 in order to reconcile any changes that may have been made to such data objects 24 during disconnection. FIG. 8 presents an exemplary scenario featuring a display unit 32 having a display memory 40, and a base unit 46 having a base memory 124, wherein a particular data object 24 is concurrently stored in both the display memory 40 and the base memory 124. At a first time point 120, the display unit 32 is disconnected from the base unit, and a change is made to the data object 24 (e.g., creating a new version 1.1 of the data object 24 from its original 1.0 version.) At a second time point 122, when the display unit 32 is reconnected to the base unit 46, the operating system 62 may synchronize the data objects 24 in the display memory 40 with the corresponding data objects 24 in the base memory 124, and therefore may propagate the new version of the data object 24 from the display memory 40 to the base memory 124. Alternatively or additionally, if both the display unit and the base unit 46 include wireless network adapters, the synchronization may occur continuously, such that changes may be propagated between the units through a wireless connection.

In a second such variation, the data objects 24 comprising the computing environment 14 of the user 12 may be differently allocated among the display memory 40 of the display unit 32 and the base memory 124 of the base unit 46.

For example, the base memory 124 may be represented as a separate volume, and data objects 24 stored in the base memory 124 may only be available to the display unit 32 when connected to the base unit 46. Alternatively, if both the display unit 32 and the base unit 46 include wireless network adapters, the synchronization may occur continuously, the operating system 62 may be configured to, upon receiving a request to access a data object 24 stored in the base memory 124 and not stored in the display memory 40 while the display unit 32 is disconnected from the base unit 46, retrieve the data object 24 from the base unit 46 through a wireless connection established between the units.

Figure 9:
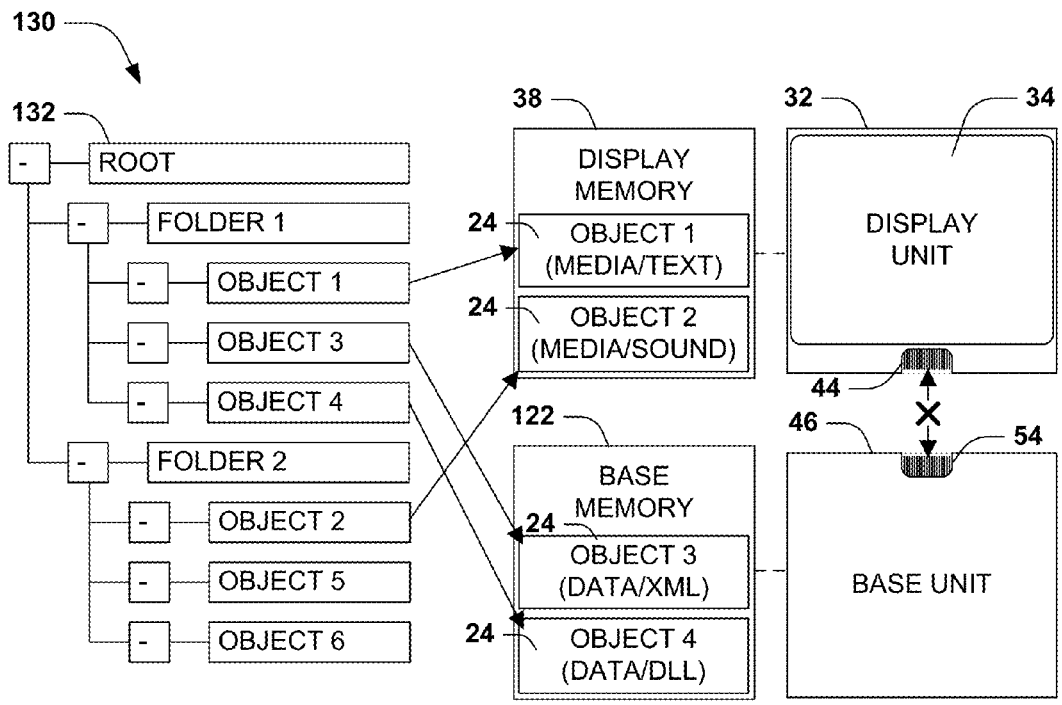
FIG. 9 is an illustration of an exemplary scenario featuring an allocation of data objects of an object hierarchy between a display memory and a base memory based on the data object types of the data objects.

In a third such variation, respective data objects 24 may have a data object type, and wherein data objects 24 of particular data object types may be stored in the display memory 40 of the display unit 32 or in the base memory 124 of the base unit 46 depending on the data object type. FIG. 9 presents an exemplary scenario 130 featuring this variation, utilizing an object hierarchy 132 comprising a set of data objects 24. The operating system 62 may define one or more portable data object types that the user 12 may wish to access while the display unit 32 is disconnected from the base unit 46, e.g., media objects that the user may wish to view in a portable setting. The operating system 62 may therefore be configured to store in the display memory 40 all portable data objects 24 of a portable data object type, which may be rendered by the display unit 32 for viewing in a portable setting, while other data objects 24 may be stored in the base memory 124 of the base unit 46. Alternatively or additionally, the user 12 may be able to specify which data objects 24 or which data object types are to be stored in the display memory 40 and/or the base memory 124. In this manner, the data objects 24 may be allocated between the display memory 40 and the base memory 124 in a manner that promotes the convenience of the display unit 32 to the user 12 in a detached usage scenario. Those of ordinary skill in the art may devise many techniques for storing data objects 24 in the base memory 124 and/or the display memory 40 while implementing the techniques presented herein.

An eighth aspect that may vary among embodiments of these techniques relates to the manner of configuring and storing applications 24 in the display memory 40 (and/or the base memory 124, if present) and executing such applications 24 within the operating system 62. As a first example, all applications 24 may be stored in the display memory 40, and may be executed on the display processor 38 when the display unit 32 is disconnected from the base unit 46, or on the base processor 48 when the display unit 32 is connected to the base unit 46. As a second example of this eighth aspect, applications may be identified as resource-intensive applications (those that utilize a large amount of computing resources, such as three-dimensional games and sophisticated media editing applications) and resource-conserving applications (those that utilize a small amount of computing resources, such as media viewing applications and simple media editing applications.) The resource-intensive applications may be stored in a base memory 124 of the base unit 46, and may only be accessible while the display unit 32 is connected to the base unit 46, while the resource-conserving applications may be stored in the display memory 40 of the display unit 32 and may be available at any time.

As a third example of this eighth aspect, one or more applications 24 may comprise "dual-mode" applications that may be executed in a resource-intensive mode or a resource-conserving mode, and the operating system 62 may automatically switch execution modes upon a connection of the display unit 32 to the base unit 46 or a disconnection therefrom by restarting the application 24 in the corresponding mode. As a first alternative, one or more dual-mode applications 24 may be toggled between these modes during execution without restarting the application (e.g., by disabling more resource-intensive features or presenting a less complex user interface.) As a second alternative, the display memory 40 of the display unit 32 may include a resource-conserving version of an application 24 and a base memory 124 of the base unit 46 may include a resource-intensive version of the application 24, and the version of the application 24 matching the state of the computing environment 64 may be executed upon request.

As a fourth example of this eighth aspect, the operating system 62 may be configured to manage the execution of applications 24 based on the resource-intensive or resource-conserving mode of the computing environment 64, based on the connection or disconnection status of the display unit 32 and the base unit 46. For example, if the computing environment 64 includes resource-intensive applications that may be executable within the resource-intensive mode of the computing environment, the operating system 62 may halt any resource-intensive applications 24 that may be executing within the computing environment 64 upon a disconnection of the display unit 32 from the base unit 46. This halting may involve, e.g., terminating the application 24 or suspending the application 24 in memory or to disk until the display unit 32 is reconnected to the base unit 46. Alternatively, the operating system 62 may query the user 12 upon a disconnection of the display unit 32 from the base unit 46 to determine whether and how to halt any resource-intensive applications that may be executing.

Figure 10:
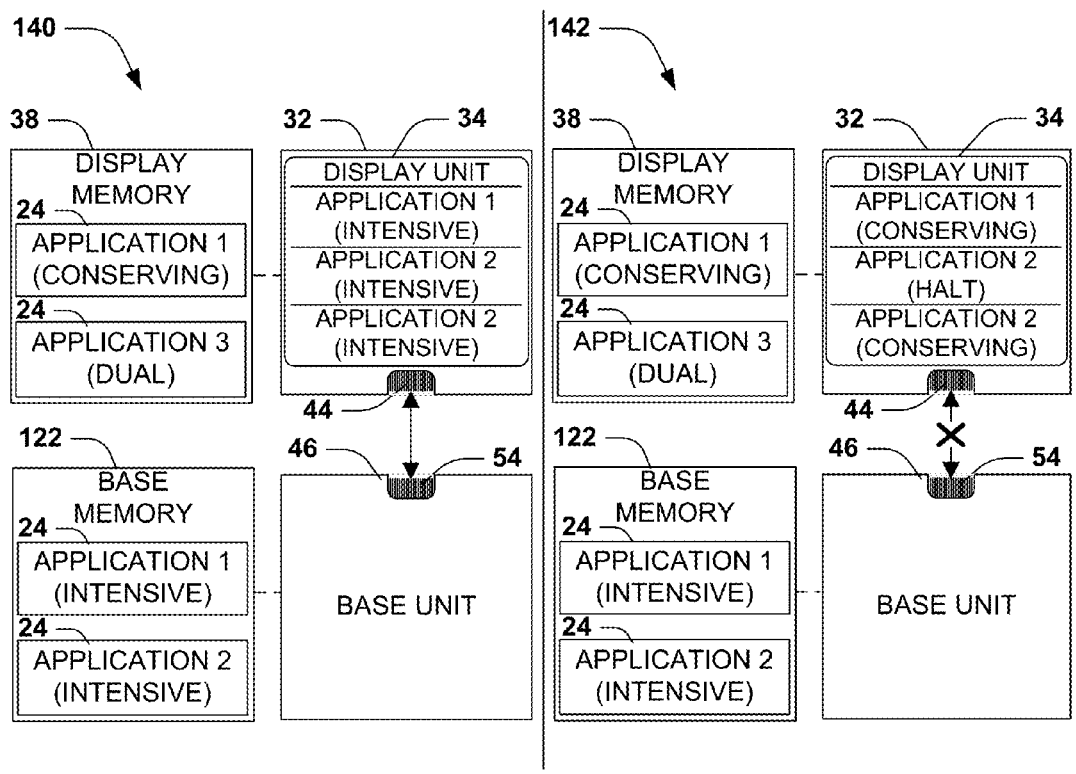
FIG. 10 is an illustration of an exemplary scenario featuring a management of various applications according to the connected or disconnected status of the display unit and the base unit.

FIG. 10 presents an exemplary scenario illustrating the handling by the operating system 62 of various applications 24 running within the computing environment 64. The computing environment 64 may include three applications 24: a first application 24 having a resource-intensive version stored in a base memory 124 of the base unit 46 and a resource-conserving version stored in the display memory 40 of the display unit 32; a second application 24 having only a resource-intensive version stored in the base memory 124; and a third application 24 comprising a dual-mode application. At a first time point 142, when the display unit 32 is connected to the base unit 46, all three applications may be executing in a resource-intensive mode. However, at a second time point 144, the display unit 32 may be disconnected from the base unit 46, and the operating system 62 may endeavor to manage the execution of the applications 24 in accordance with the resource-conserving mode of the computing environment 64. The first application 24 may be restarted using the resource-conserving version of the first application 24 stored in the display memory 40. The second application 24, having no resource-conserving version, may be halted (e.g., suspended in memory, suspended to disk, or terminated.) The third application 24, as a dual-mode application, may simply be restarted as and/or toggled into the resource-conserving mode. Reverse operations may be performed when the display unit 32 is reconnected to the base unit 46 (e.g., the first application 24 and the third application 24 may be restarted and/or toggled back into a resource-intensive mode, and the second application 24 may be resumed.) In this manner, the operating system 62 may manage the execution of applications 24 in accordance with the mode of the computing environment 64. Those of ordinary skill in the art may devise many configurations of applications 24 and the operating system 62 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
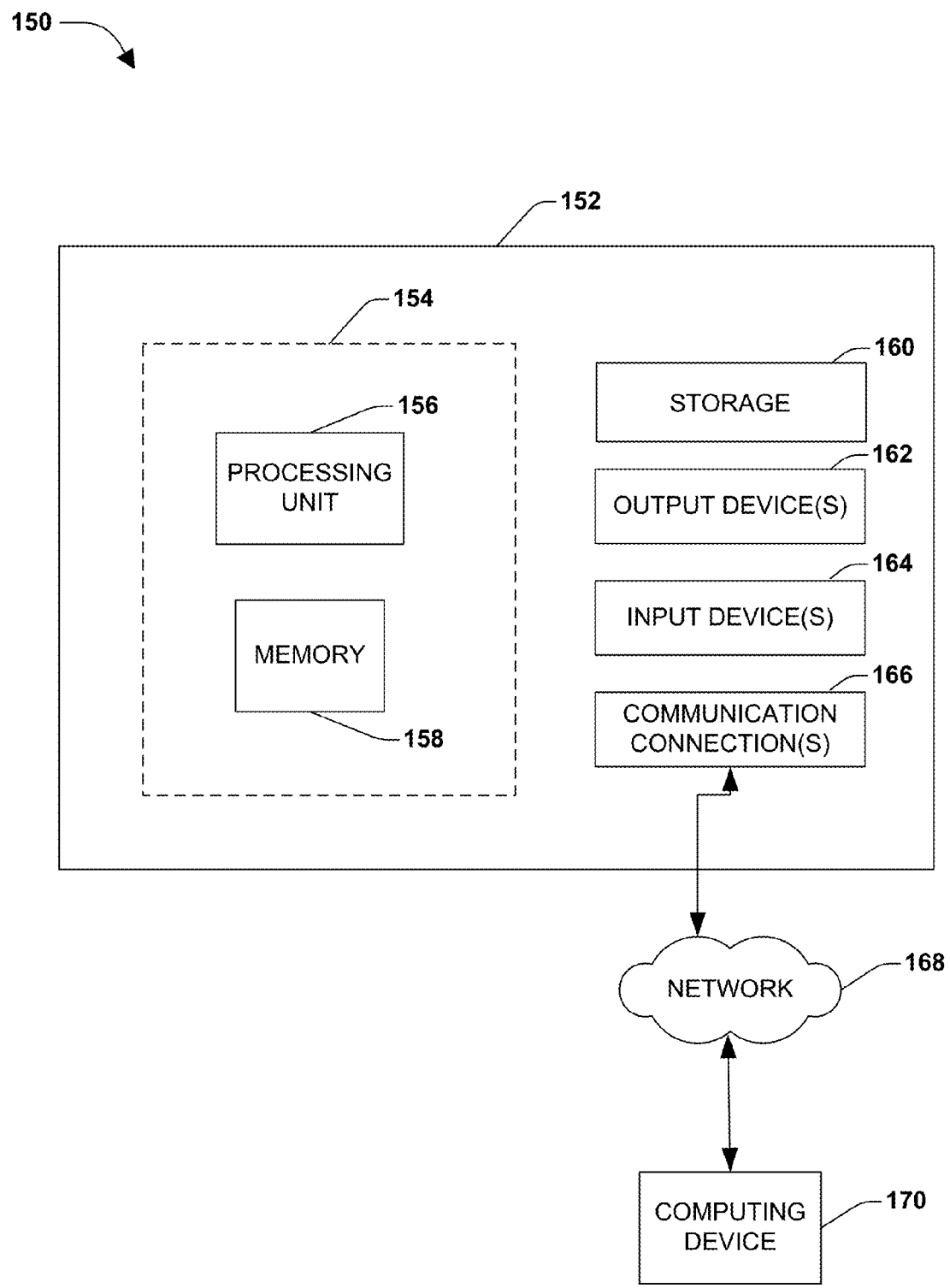
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 152 comprising a computing device 154 configured to implement one or more embodiments provided herein. In one configuration, computing device 154 includes at least one processing unit 156 and memory 158. Depending on the exact configuration and type of computing device, memory 158 may be volatile (such as RAM, for example), non-volatile (such as ROM, flash memory, etc., for example) or some combination of the two. This configuration is illustrated in FIG. 11 by dashed line 154.

In other embodiments, device 154 may include additional features and/or functionality. For example, device 154 may also include additional storage (e.g., removable and/or non-removable) including, but not limited to, magnetic storage, optical storage, and the like. Such additional storage is illustrated in FIG. 11 by storage 160. In one embodiment, computer readable instructions to implement one or more embodiments provided herein may be in storage 160. Storage 160 may also store other computer readable instructions to implement an operating system, an application program, and the like. Computer readable instructions may be loaded in memory 158 for execution by processing unit 156, for example.

The term "computer readable media" as used herein includes computer storage media. Computer storage media includes volatile and nonvolatile, removable and non-removable media implemented in any method or technology for storage of information such as computer readable instructions or other data. Memory 158 and storage 160 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 154. Any such computer storage media may be part of device 154.

Device 154 may also include communication connection(s) 166 that allows device 154 to communicate with other devices. Communication connection(s) 166 may include, but is not limited to, a modem, a Network Interface Card (NIC), an integrated network interface, a radio frequency transmitter/receiver, an infrared port, a USB connection, or other interfaces for connecting computing device 154 to other computing devices. Communication connection(s) 166 may include a wired connection or a wireless connection. Communication connection(s) 166 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 154 may include input device(s) 164 such as keyboard, mouse, pen, voice input device, touch input device, infrared cameras, video input devices, and/or any other input device. Output device(s) 162 such as one or more displays, speakers, printers, and/or any other output device may also be included in device 154. Input device(s) 164 and output device(s) 162 may be connected to device 154 via a wired connection, wireless connection, or any combination thereof. In one embodiment, an input device or an output device from another computing device may be used as input device(s) 164 or output device(s) 162 for computing device 154.

Components of computing device 154 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 154 may be interconnected by a network. For example, memory 158 may be comprised of multiple physical memory units located in different physical locations interconnected by a network.

Those skilled in the art will realize that storage devices utilized to store computer readable instructions may be distributed across a network. For example, a computing device 170 accessible via network 168 may store computer readable instructions to implement one or more embodiments provided herein. Computing device 154 may access computing device 170 and download a part or all of the computer readable instructions for execution. Alternatively, computing device 154 may download pieces of the computer readable instructions, as needed, or some instructions may be executed at computing device 154 and some at computing device 170.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of configuring a computing device, the computing device comprising an operating system and an application other than an operating system:
    executing the application other than the operating system in a resource-intensive mode, wherein executing in the resource-intensive mode comprises executing on a resource-intensive processor and executing with a set of installed applications available;
    detecting a toggling event; and
    in response to the toggling event, executing the application other than the operating system in a resource-conserving mode, wherein executing in the resource-conserving mode comprises executing on a resource-conserving processor and executing with a proper subset of the set of installed applications available.

2. The method of claim 1, wherein the resource-conserving processor is associated with a display unit and the resource-intensive processor is associated with a base unit, the display unit and the base unit being removably attached.

3. The method of claim 2, wherein the base unit includes one or more input devices.

4. The method of claim 2 further comprising, while the display unit is attached to the base unit, determining whether to use an external power source, a base battery, or a battery connected to the computing device, the determining based at least on the base unit being connected to the external power source, the base unit being disconnected from the external power source, the base battery being not depleted, and the base battery being depleted.

5. The method of claim 2, wherein the base unit is a first base unit, the display unit is operable with the first base unit and with a second base unit.

6. The method of claim 2, wherein the toggling event comprises detecting detachment of the display unit from the base unit.

7. The method of claim 1, wherein the application other than the operating system is executed in the resource-conserving mode without a restart of the application other than the operating system.

8. The method of claim 1, wherein the application other than the operating system is executed in the resource-conserving mode upon a restart of the application other than the operating system.

9. A method of configuring a computer, the computer having a resource-conserving processor and being attachable to a base unit, and the base unit comprising a resource-intensive processor, the method comprising:
    executing, on at least one of the resource-conserving processor or the resource-intensive processor, instructions that cause the computer to:
    determine whether the computer is attached to the base unit;
    while the computer is attached to the base unit, instruct a software application to execute in a resource-intensive mode, wherein executing in the resource-intensive mode comprises executing on the resource-intensive processor and executing with all installed applications available; and
    while the computer is detached from the base unit, instruct the software application to execute in a resource-conserving mode, wherein executing in the resource-conserving mode comprises executing on the resource-conserving processor and executing with fewer than all installed applications available.

10. The method of claim 9, wherein executing in the resource-intensive mode enables a group of features of the software application and executing in the resource-conserving mode restricts at least some of the group of features of the software application.

11. The method of claim 9, wherein the base unit is communicatively coupled to one or more of a keyboard, a mouse, a touchpad, a display, or an external storage device.

12. The method of claim 9 further comprising, while the computer is attached to the base unit, determining whether to use an external power source, a base battery, or a battery connected to the computer, the determining based at least on the base unit being connected to the external power source, the base unit being disconnected from the external power source, the base battery being not depleted, and the base battery being depleted.

13. The method of claim 9 further comprising:
while the computer is attached to the base unit, presenting, on a display of the computer, a computing environment of the software application; and
while the computer is detached from the base unit, maintaining presentation of the computing environment of the software application on the display of the computer.

14. The method of claim 13, wherein the maintaining the presentation of the computing environment comprises presenting the same computing environment in at least one of a reduced brightness, a reduced contrast, or a reduced clarity.

15. One or more computer storage media, excluding transitory computer media storing computer readable instructions that, when executed by one or more processors, cause the one or more processors to perform acts comprising:
executing at least one application in a resource-intensive mode, wherein executing in the resource-intensive mode comprises executing on a resource-intensive processor and executing with a set of applications available;
detecting a triggering event; and
in response to the triggering event, executing the at least one application in a resource-conserving mode, wherein executing in the resource-conserving mode comprises executing on a resource-conserving processor and executing with a proper subset of the set of installed applications available.

16. The one or more computer storage media of claim 15, wherein the resource-conserving processor is associated with a display unit and the resource-intensive processor is associated with a base unit, the display unit and the base unit being removably attached.

17. The one or more computer storage media of claim 16, wherein the base unit includes one or more input devices.

18. The one or more computer storage media of claim 15, wherein the triggering event includes detaching a computing device associated with the resource-conserving processor from a base unit associated with the resource-intensive processor.

* * * * *